United States Patent
Konishi et al.

(10) Patent No.: US 10,035,728 B2
(45) Date of Patent: Jul. 31, 2018

(54) CONCRETE COMPOSITION AND MAKING METHOD

(71) Applicant: Shin-Etsu Chemical Co., Ltd., Tokyo (JP)

(72) Inventors: Hidekazu Konishi, Joetsu (JP); Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/799,531

(22) Filed: Oct. 31, 2017

(65) Prior Publication Data

US 2018/0118619 A1   May 3, 2018

(30) Foreign Application Priority Data

Nov. 1, 2016  (JP) .................................. 2016-214188
Jun. 30, 2017 (JP) .................................. 2017-128354

(51) Int. Cl.
| | | |
|---|---|---|
| C04B 18/24 | (2006.01) |
| C04B 24/18 | (2006.01) |
| C04B 24/02 | (2006.01) |
| C04B 24/04 | (2006.01) |
| C04B 14/06 | (2006.01) |
| C04B 14/04 | (2006.01) |
| C04B 40/00 | (2006.01) |
| C04B 28/04 | (2006.01) |
| C04B 103/30 | (2006.01) |
| C04B 103/40 | (2006.01) |

(52) U.S. Cl.
CPC .............. *C04B 18/24* (2013.01); *C04B 14/04* (2013.01); *C04B 14/06* (2013.01); *C04B 24/02* (2013.01); *C04B 24/023* (2013.01); *C04B 24/04* (2013.01); *C04B 24/18* (2013.01); *C04B 28/04* (2013.01); *C04B 40/0028* (2013.01); C04B 2103/302 (2013.01); C04B 2103/304 (2013.01); C04B 2103/402 (2013.01)

(58) Field of Classification Search
CPC .......... C04B 18/24; C04B 24/18; C04B 24/02; C04B 24/023; C04B 24/04; C04B 14/06; C04B 14/64; C04B 40/0028; C04B 28/04; C04B 2103/302; C04B 2103/304; C04B 2103/402

See application file for complete search history.

(56) References Cited

U.S. PATENT DOCUMENTS

| | | | | |
|---|---|---|---|---|
| 6,849,729 B2 * | 2/2005 | Obara | ..................... | A61K 8/731 536/100 |
| 7,304,104 B2 * | 12/2007 | Yamashita | ............ | C08F 283/06 524/5 |
| 7,321,006 B2 * | 1/2008 | Hayashiya | .......... | C04B 24/2647 524/4 |
| 8,728,273 B2 * | 5/2014 | Heiskanen | ........... | C09D 101/02 162/157.6 |
| 8,822,675 B2 * | 9/2014 | Maruyama | ........... | A61K 9/0056 536/124 |

FOREIGN PATENT DOCUMENTS

| | | | |
|---|---|---|---|
| JP | 4-139047 A | * | 5/1992 |
| JP | 7-267715 A | * | 10/1995 |
| JP | 9-118554 A | | 5/1997 |
| JP | 2004-149362 A | | 5/2004 |

* cited by examiner

*Primary Examiner* — Anthony J Green
(74) *Attorney, Agent, or Firm* — Birch, Stewart, Kolasch & Birch, LLP

(57) ABSTRACT

A concrete composition is obtained by dry mixing cement and an aggregate, adding thereto a water dispersion which is preformed by dispersing a low substituted hydroxypropyl cellulose having a hydroxypropoxy substitution of 5-16 wt % in the form of fibrous particles having an aspect ratio of 4-7 in water, and mixing the ingredients. Because of reduced drying shrinkage, only a little drop of fluidity, and proper flow, the concrete composition is useful to form concrete buildings having frost damage resistance.

11 Claims, No Drawings

CONCRETE COMPOSITION AND MAKING METHOD

CROSS-REFERENCE TO RELATED APPLICATION

This non-provisional application claims priority under 35 U.S.C. § 119(a) on Patent Application Ser. Nos. 2016-214188 and 2017-128354 filed in Japan on Nov. 1, 2016 and Jun. 30, 2017, respectively, the entire contents of which are hereby incorporated by reference.

TECHNICAL FIELD

This invention relates to a concrete composition which has reduced drying shrinkage, only a little drop of fluidity, and proper flow and is useful to form concrete buildings having frost damage resistance, and a method for preparing the same.

BACKGROUND ART

In a concrete composition containing alkaline cement, low substituted hydroxypropyl celluloses (i.e., celluloses having a low hydroxypropoxy substitution) are liable to swell without dissolving in water, but partially dissolve to invite a viscosity buildup. By virtue of these attributes, the low substituted hydroxypropyl celluloses are sometimes used for suppressing segregation of concrete material.

For example, Patent Document 1 discloses a shrinkage-compensating concrete material comprising a low substituted hydroxypropyl cellulose as a segregation inhibitor, a blowing agent, expansive additive, and water-reducing agent. Patent Document 2 describes a high fluidity concrete comprising as a segregation inhibitor, an aqueous gel of hydroxypropyl cellulose which is prepared by dispersing a low substituted hydroxypropyl cellulose in water and shear grinding the dispersion.

CITATION LIST

Patent Document 1: JP-A 2004-149362
Patent Document 2: JP-A H09-118554

SUMMARY OF INVENTION

However, Patent Document 1 wherein water is added after a low substituted hydroxypropyl cellulose in powder form is dry mixed with cement, a fine aggregate and other ingredients, has a possibility that the concrete undergoes a significant loss of fluidity as a result of the low substituted hydroxypropyl cellulose absorbing water and swelling. The concrete of Patent Document 2 may lose the dry shrinkage compensating effect because the low substituted hydroxypropyl cellulose can be chopped into short fibers during the step of shear grinding the dispersion of the low substituted hydroxypropyl cellulose in water.

An object of the invention is to provide a concrete composition which has reduced drying shrinkage, only a little drop of fluidity, and proper flow and is useful to form concrete buildings having frost damage resistance, and a method for preparing the concrete composition.

With a focus on the particle shape of low substituted hydroxypropyl cellulose, the inventors have found that the problem is solved by using a low substituted hydroxypropyl cellulose in the form of fibrous particles having a specific aspect ratio and adding the low substituted hydroxypropyl cellulose in water dispersion form.

According to the invention, when a water dispersion of a low substituted hydroxypropyl cellulose having a hydroxypropoxy substitution of 5 to 16% by weight and an aspect ratio of from 4 to 7 is blended with cement and an aggregate, there is obtained a concrete composition which has reduced drying shrinkage, only a little drop of fluidity, and proper flow and is useful to form concrete buildings having frost damage resistance.

In one aspect, the invention provides a concrete composition comprising, in admixture, a water dispersion of a low substituted hydroxypropyl cellulose having a hydroxypropoxy substitution of 5 to 16% by weight in the form of fibrous particles having an aspect ratio of 4 to 7, cement, and an aggregate.

In a preferred embodiment, the low substituted hydroxypropyl cellulose has an average particle size of 40 to 100 μm and a 90% cumulative particle size of 130 to 250 μm as measured by laser diffractometry.

In a preferred embodiment, the water dispersion contains the low substituted hydroxypropyl cellulose in a concentration of 0.01 to 20% by weight.

In a preferred embodiment, the low substituted hydroxypropyl cellulose is added in an amount of 0.01 to 10% by weight based on the unit cement content.

The composition may further comprise at least one water-reducing agent selected from lignin, polycarboxylate, and melamine-based water-reducing agents; a surfactant containing at least a higher alcohol and a fatty acid ester; and/or an air-entraining agent.

In another aspect, the invention provides a method for preparing a concrete composition, comprising the steps of dry mixing cement and an aggregate, adding a water dispersion to the dry mix, the water dispersion being preformed by dispersing a low substituted hydroxypropyl cellulose having a hydroxypropoxy substitution of 5 to 16% by weight in the form of fibrous particles having an aspect ratio of 4 to 7 in water, and mixing the contents.

The method may further include the step of adding at least one water-reducing agent selected from lignin, polycarboxylate, and melamine-based water-reducing agents to the dry mix together with the water dispersion of the low substituted hydroxypropyl cellulose; the step of adding a surfactant containing at least a higher alcohol and a fatty acid ester to the cement and the aggregate; and/or the step of adding an air-entraining agent to the dry mix together with the water dispersion of the low substituted hydroxypropyl cellulose.

ADVANTAGEOUS EFFECTS OF INVENTION

The concrete composition of the invention has advantages including reduced drying shrinkage, only a little drop of fluidity, and proper flow and is useful to form concrete buildings having frost damage resistance.

DESCRIPTION OF PREFERRED EMBODIMENTS

The concrete composition of the invention is defined as comprising a water dispersion of a specific low substituted hydroxypropyl cellulose, cement, and aggregate as essential ingredients.

The low substituted hydroxypropyl cellulose has a hydroxypropoxy substitution of 5 to 16% by weight, preferably 5.5 to 15.5% by weight, and most preferably 6 to 15% by weight. If the hydroxypropoxy substitution exceeds 16% by weight, the hydroxypropyl cellulose becomes water soluble and allows for more air entrainment. For the purpose of controlling the air content, a defoamer must be added, which adversely affects frost damage resistance. If the hydroxypropoxy substitution is less than 5% by weight, the hydroxypropyl cellulose becomes less water absorptive, failing to exert a drying shrinkage reduction effect.

The hydroxypropoxy substitution of the low substituted hydroxypropyl cellulose is defined in the Japanese Pharmacopoeia, 17th Edition. Measurement may be made according to the analysis of the degree of substitution of hypromellose (hydroxypropyl methyl cellulose) prescribed in the Japanese Pharmacopoeia, 17th Edition.

The low substituted hydroxypropyl cellulose has an aspect ratio of from 4 to 7, preferably 4.5 to 6.5, and more preferably 4.5 to 6. If the aspect ratio exceeds 7, then the hydroxypropyl cellulose particles have an elongated fibrous shape, which adversely affects concrete fluidity. If the aspect ratio is less than 4, the fibrous particles which are otherwise responsible for reducing drying shrinkage are too short to exert the drying shrinkage reduction effect.

The aspect ratio of particles may be determined by measuring the length and breadth of 50 to 200 low substituted hydroxypropyl cellulose particles under a typical optical microscope (100×), computing the ratio of length/breadth and averaging.

It is preferred from the standpoint of concrete fluidity that the low substituted hydroxypropyl cellulose have an average particle size (50% cumulative particle size) of 40 to 100 μm, more preferably 45 to 70 μm, and even more preferably 50 to 65 μm. Also preferably, the hydroxypropyl cellulose has a 90% cumulative particle size of 130 to 250 μm, more preferably 150 to 200 μm. It is noted that the average particle size and 90% cumulative particle size may be measured as volume basis particle size by powder particle size measurement based on laser light diffractometry, for example, using HELOS & RODOS (Japan Laser Corp.).

The low substituted hydroxypropyl cellulose should preferably be added to the kneading water to form a water dispersion prior to blending. Blending the low substituted hydroxypropyl cellulose in the water dispersion form is advantageous in providing the concrete with fluidity. The concentration of the low substituted hydroxypropyl cellulose in the water dispersion is preferably 0.01 to 20% by weight, more preferably 0.1 to 15% by weight, even more preferably 0.5 to 10% by weight, and most preferably 1 to 5% by weight based on the total weight of water in the concrete composition.

The entire amount of water to be added to the concrete composition may be used in preparing the water dispersion of the low substituted hydroxypropyl cellulose. Alternatively, a part of water may be used in preparing the water dispersion and the remaining part of water may be added as such to the concrete composition.

It is preferred from the standpoint of drying shrinkage reduction that the amount of the low substituted hydroxypropyl cellulose added is 0.01 to 10% by weight, more preferably 0.1 to 9% by weight, even more preferably 0.2 to 8% by weight, and most preferably 0.5 to 5% by weight based on the unit cement content. As used herein, the term "unit cement content" refers to the weight of cement per m$^3$ of fresh concrete.

The cement used herein is not particularly limited. Examples include various types of cement such as ordinary Portland cement, high-early-strength Portland cement, moderate-heat Portland cement, blast-furnace slag cement, silica cement, fly-ash cement, alumina cement, and ultra-high-early-strength Portland cement.

The concrete composition preferably has a water/cement ratio (% by weight) of from 30 to 72% by weight, more preferably from 45 to 63% by weight in view of material segregation.

The concrete composition contains a fine aggregate and a coarse aggregate. Examples of the fine aggregate include river sand, pit sand, land sand, and crushed sand. Examples of the coarse aggregate include river gravel, pit gravel, land gravel, and crushed stone. The particle size of the fine aggregate is preferably up to 5 mm. The particle size of the coarse aggregate is larger than the fine aggregate, and preferably up to 40 mm, more preferably up to 25 mm.

The aggregate (fine aggregate+coarse aggregate) is preferably added in an amount of 1,000 to 2,300 kg, more preferably 1,150 to 2,150 kg per m$^3$ of concrete. While the amount of the aggregate (fine aggregate+coarse aggregate) is in the above range, the fine aggregate is preferably added in an amount of 400 to 1,100 kg, more preferably 500 to 1,000 kg per m$^3$ of concrete and the coarse aggregate is preferably added in an amount of 600 to 1,200 kg, more preferably 650 to 1,150 kg per m$^3$ of concrete. These aggregates are proportioned in the concrete composition so that their total amount may fall within the above range.

The percentage of the fine aggregate is preferably 33 to 51% by volume, more preferably 35 to 50% by volume, even more preferably 37 to 49% by volume based on the total volume of the aggregates for retention of fluidity or sufficient strength.

Further, a water-reducing agent may be added for ensuring high fluidity retention with a smaller amount of water, if necessary.

The water-reducing agents used herein include lignin, polycarboxylic acid, and melamine derivatives. Exemplary of the lignin are lignin sulfonic acid salts and derivatives thereof. Exemplary of the polycarboxylic acid are polycarboxylic acid ethers, composites of polycarboxylic acid ethers with crosslinked polymers, composites of polycarboxylic acid ethers with oriented polymers, composites of polycarboxylic acid ethers with highly modified polymers, polyether carboxylic acid-based polymers, maleic acid copolymers, maleate copolymers, maleic acid derivative copolymers, carboxyl-containing polyethers, sulfone-terminated polycarboxylate-containing multiple polymers, polycarboxylic acid-based graft copolymers, polycarboxylic acid-based compounds, and polycarboxylic acid ether-based polymers. Exemplary of the melamine are melamine-sulfonic acid-formaldehyde condensates, melamine-sulfonic acid salt condensates, and melamine-sulfonic acid salt-polyol condensates.

When added, the amount of the water-reducing agent is preferably 0.01 to 5% by weight, more preferably 0.1 to 3% by weight based on the unit cement content from the standpoint of concrete fluidity.

If necessary, an air-entraining (AE) agent may be added to the concrete composition for providing the predetermined air content and rendering the concrete durable.

Suitable AE agents include anionic surfactants, cationic surfactants, nonionic surfactants, and ampholytic surfactants. Examples of the anionic surfactant include carboxylic acid, sulfate, sulfonic acid, and phosphate type surfactants. Examples of the cationic surfactant include amine salt, primary amine salt, secondary amine salt, tertiary amine salt, and quaternary amine salt type surfactants. Examples of the nonionic surfactant include ester, ester-ether, ether, and alkanolamide type surfactants. Examples of the ampholytic surfactant include amino acid and sulfobetaine type surfactants. Of these, anionic surfactant-based AE agents are preferred from the standpoint of air entrainment.

The amount of the AE agent added is preferably 0.0001 to 1% by weight, more preferably 0.001 to 0.1% by weight based on the unit cement content from the standpoint of an air content in concrete. According to JIS A 5308, the air content of typical concrete is preferably in a range of 3.0 to 6.0% by volume. The air content within the range is also preferred in the invention.

If necessary, a surfactant containing at least a higher alcohol and a fatty acid ester may be added to the concrete composition for the purposes of preventing water from evaporating from the concrete surface and enhancing the drying shrinkage reduction effect. The surfactant is typically a mixture of a higher alcohol and a fatty acid ester.

Examples of the higher alcohol include linear saturated alcohols, linear unsaturated alcohols, branched saturated alcohols, and branched unsaturated alcohols, while they are preferably of 12 to 30 carbon atoms, more preferably 15 to 25 carbon atoms.

Suitable linear saturated alcohols include lauryl alcohol (C12), myristyl alcohol (C14), cetyl alcohol (C16), stearyl alcohol (C18), icosyl alcohol (C20), docosyl alcohol (C22), tetracosyl alcohol (C24), hexacosyl alcohol (C26), octacosyl alcohol (C28), and triacontyl alcohol (C30).

Suitable linear unsaturated alcohols include dodecenyl alcohol (C12), tetradecenyl alcohol (C14), hexadecenyl alcohol (C16), oleyl alcohol (C18), icosenyl alcohol (C20), dococenyl alcohol (C22), tetracosenyl alcohol (C24), hexacosenyl alcohol (C26), octacosenyl alcohol (C28), and triacontenyl alcohol (C30).

Suitable branched saturated alcohols include isolauryl alcohol (C12), isomyristyl alcohol (C14), isocetyl alcohol (C16), isostearyl alcohol (C18), isoicosyl alcohol (C20), isodocosyl alcohol (C22), isotetracosyl alcohol (C24), isohexacosyl alcohol (C26), isooctacosyl alcohol (C28), isotriacontyl alcohol (C30), dodecan-2-ol (C12), tetradecan-2-ol (C14), hexadecane-2-ol (C16), octadecan-2-ol (C18), icosan-2-ol (C20), docosan-2-ol (C22), tetracosan-2-ol (C24), hexacosan-2-ol (C26), octacosan-2-ol (C28), triacontan 2. of (C30), and 2,4,6,8-tetramethyloctyl alcohol (C12).

Suitable branched unsaturated alcohols include geraniol (C10) and phytol (C20). Besides, cholesteryl alcohol (C27) is also useful.

Of the higher alcohols, linear saturated alcohols of C12 to C30, especially C15 to C25 such as lauryl alcohol, myristyl alcohol, cetyl alcohol, stearyl alcohol, icosyl alcohol, docosyl alcohol, tetracosyl alcohol, hexacosyl alcohol, octacosyl alcohol, and triacontyl alcohol are preferred from the standpoint of water evaporation preventing effect.

Examples of the fatty acid ester include aliphatic monocarboxylic acid esters and aliphatic dicarboxylic acid diesters, which may be either saturated or unsaturated.

The aliphatic monocarboxylic acid esters are preferably of 3 to 48 carbon atoms, more preferably 15 to 20 carbon atoms. Suitable aliphatic monocarboxylic acid esters include methyl acetate (C3), ethyl acetate (C4), propyl acetate (C5), butyl acetate (C6), hexyl acetate (C7), lauryl acetate (C14), stearyl acetate (C20), tetracosyl acetate (C26), triacontyl acetate (C32), methyl butyrate (C5), ethyl butyrate (C6), propyl butyrate (C7), butyl butyrate (C8), hexyl butyrate (C10), lauryl butyrate (C16), stearyl butyrate (C22), tetracosyl butyrate (C28), triacontyl butyrate (C34), methyl isobutyrate (C5), ethyl isobutyrate (C6), propyl isobutyrate (C7), butyl isobutyrate (C8), hexyl isobutyrate (C10), lauryl isobutyrate (C16), stearyl isobutyrate (C22), tetracosyl isobutyrate (C28), triacontyl isobutyrate (C34), methyl valerate (C6), ethyl valerate (C7), propyl valerate (C8), butyl valerate (C9), hexyl valerate (C11), lauryl valerate (C17), stearyl valerate (C23), tetracosyl valerate (C29), triacontyl valerate (C38), methyl isovalerate (C6), ethyl isovalerate (C7), propyl isovalerate (C8), butyl isovalerate (C9), hexyl isovalerate (C11), lauryl isovalerate (C17), stearyl isovalerate (C23), tetracosyl isovalerate (C28), triacontyl isovalerate (C38), methyl pivalate (C6), ethyl pivalate (C7), propyl pivalate (C8), butyl pivalate (C9), hexyl pivalate (C11), lauryl pivalate (C17), stearyl pivalate (C23), tetracosyl pivalate (C29), triacontyl pivalate (C38), methyl laurate (C13), ethyl laurate (C14), propyl laurate (C15), butyl laurate (C16), hexyl laurate (C18), lauryl laurate (C24), stearyl laurate (C30), tetracosyl laurate (C36), triacontyl laurate (C42), methyl myristate (C15), ethyl myristate (C16), propyl myristate (C17), butyl myristate (C18), hexyl myristate (C20), lauryl myristate (C26), stearyl myristate (C32), tetracosyl myristate (C38), triacontyl myristate (C44), methyl palmitate (C17), ethyl palmitate (C18), propyl palmitate (C19), butyl palmitate (C20), hexyl palmitate (C22), lauryl palmitate (C28), stearyl palmitate (C34), tetracosyl palmitate (C40), triacontyl palmitate (C46), methyl stearate (C19), ethyl stearate (C20), propyl stearate (C21), butyl stearate (C22), hexyl stearate (C24), lauryl stearate (C30), stearyl stearate (C34), tetracosyl stearate (C40), triacontyl stearate (C48), methyl oleate (C19), ethyl oleate (C20), propyl oleate (C21), butyl oleate (C22), hexyl oleate (C24), lauryl oleate (C30), stearyl oleate (C34), tetracosyl oleate (C40), and triacontyl oleate (C48).

The aliphatic dicarboxylic acid diesters are preferably of 4 to 70 carbon atoms. Suitable aliphatic dicarboxylic acid diesters include dimethyl oxalate (C4), diethyl oxalate (C6), dipropyl oxalate (C8), dibutyl oxalate (C10), dihexyl oxalate (C14), dilauryl oxalate (C26), distearyl oxalate (C38), ditetracosyl oxalate (C50), ditriacontyl oxalate (C62), dimethyl malonate (C5), diethyl malonate (C7), dipropyl malonate (C9), dibutyl malonate (C11), dihexyl malonate (C15), dilauryl malonate (C27), distearyl malonate (C39), ditetracosyl malonate (C51), ditriacontyl malonate (C63), dimethyl succinate (C6), diethyl succinate (C8), dipropyl succinate (C10), dibutyl succinate (C12), dihexyl succinate (C16), dilauryl succinate (C28), distearyl succinate (C40), ditetracosyl succinate (C52), ditriacontyl succinate (C64), dimethyl glutarate (C7), diethyl glutarate (C9), dipropyl glutarate (C11), dibutyl glutarate (C13), dihexyl glutarate (C17), dilauryl glutarate (C29), distearyl glutarate (C41), ditetracosyl glutarate (C53), ditriacontyl glutarate (C65), dimethyl adipate (C8), diethyl adipate (C10), dipropyl adipate (C12), dibutyl adipate (C14), dihexyl adipate (C18), dilauryl adipate (C30), distearyl adipate (C42), ditetracosyl adipate (C54), ditriacontyl adipate (C66), dimethyl pimelate (C9), diethyl pimelate (C11), dipropyl pimelate (C13), dibutyl pimelate (C15), dihexyl pimelate (C19), dilauryl pimelate (C31), distearyl pimelate (C43), ditetracosyl pimelate (C55), ditriacontyl pimelate (C67), dimethyl suberate (C10), diethyl suberate (C12), dipropyl suberate (C14), dibutyl suberate (C16), dihexyl suberate (C20), dilauryl suberate (C32), distearyl suberate (C44), ditetracosyl suberate (C56), ditriacontyl suberate (C68), dimethyl azelate (C11), diethyl azelate (C13), dipropyl azelate (C15), dibutyl azelate (C17), dihexyl azelate (C21), dilauryl azelate (C33), distearyl azelate (C45), ditetracosyl azelate (C57), ditriacontyl azelate (C69), dimethyl sebacate (C12), diethyl sebacate (C14), dipropyl sebacate (C16), dibutyl sebacate (C18), dihexyl sebacate (C22), dilauryl sebacate (C34), distearyl sebacate (C46), ditetracosyl sebacate (C58), and ditriacontyl sebacate (C70).

Of the fatty acid esters, the aliphatic monocarboxylic acid esters of 3 to 48 carbon atoms, especially 15 to 20 carbon atoms such as methyl laurate, methyl myristate, methyl palmitate, methyl stearate, and methyl oleate are preferred from the standpoint of water evaporation preventing effect.

The higher alcohol and the fatty acid ester are preferably mixed in a weight ratio of 2:98 to 99:1, more preferably 95:5 to 50:50, even more preferably 90:10 to 60:40, and most preferably 85:15 to 70:30.

For handling, a surfactant which is solid at normal temperature is preferred. If the surfactant is liquid at normal temperature, it is preferably supported on porous powder prior to use. Suitable porous powders include silica, aluminum oxide, titanium oxide, calcium carbonate, magnesium carbonate, carbon black and talc.

Suitable surfactants are commercially available, for example, under the trade name of SN Clean Act 900 (San Nopco Ltd., surfactant which is a blend of 55 wt % of a mixture of C15-C25 linear saturated alcohol and C15-C20 aliphatic monocarboxylic acid ester with 45 wt % of porous powder, silica)

The amount of a mixture of higher alcohol and fatty acid ester used as the surfactant is preferably 0.01 to 3% by weight, more preferably 0.05 to 1% by weight, and even more preferably 0.1 to 0.5% by weight based on the unit cement content, from the standpoint of water evaporation preventing effect.

Further, an expansive additive may optionally be added to the concrete composition for the purposes of preventing cracking by shrinkage upon setting and drying, and preventing cracking by thermal stresses associated with the heat of hydration of cement. Suitable expansive additives include hauyne and lime-based additives. Any additive selected for a particular purpose may be added in an ordinary amount.

If necessary, any other additives may be added to the concrete composition insofar as the benefits of the invention are not compromised. Suitable additives include a surfactant (other than the AE agent and the higher alcohol/fatty acid ester mixture), hydrocarbon oil, wax, fatty acid amides, silicone oil, defoamer, lubricant, preservative, corrosion inhibitor, thickener, solvent and water.

Suitable other surfactants include nonionic surfactants, anionic surfactants, cationic surfactants, and ampholytic surfactants.

Suitable nonionic surfactants include polyhydric (2 to 10-hydric) alcohol fatty acid (C8-C24) esters (e.g., glycerol monooctadecanoate, ethylene glycol monooctadecanoate, sorbitan octadecenoic acid mono- or di-ester), aliphatic alkanol amides (e.g., coconut oil fatty acid monoethanol amide, dodecanoic acid diethanol amide), and alkyl (C8-C24) dialkyl (C1-C6) amine oxides (e.g., dodecyldimethylamine oxide).

Suitable anionic surfactants include alkyl (C8-C24) polyoxyalkylene (C2-C3, DOP 1 to 100) carboxylic acids or salts thereof, typically, alkali metal salts and ammonium salts (e.g., sodium dodecyl polyoxyethylene (DOP 20) ethanoate), C8-C24 sulfate salts (e.g., sodium dodecylsulfate, sodium dodecyl polyoxyethylene (DOP 30) sulfate), C8-C24 sulfonic acid salts (e.g., sodium dodecylbenzenesulfonate, sodium di-2-ethylhexyl sulfosuccinate), C4-C12 phosphate salts (e.g., sodium dodecylphosphate, sodium dodecyl polyoxyethylene (DOP 30) phosphate), alkali metal salts, ammonium salts and amine salts of carboxylic acids (e.g., sodium dodecanoate, dodecanoic acid triethanol amine, ammonium undecanoate), sodium acylated amino acid coconut oil fatty acid methyltaurine (e.g., coconut oil fatty acid acyl-L-glutamic acid triethanol amine).

Suitable cationic surfactants include quaternary ammonium salt type surfactants (e.g., octadecyltrimethylammonium chloride, dioctadecyldimethylammonium chloride), and amine salt type surfactants (e.g., octadecanoic acid diethylaminoethylamide lactic acid salt).

Suitable ampholytic surfactants include betaine type surfactants (e.g., coconut oil fatty acid amide propyl dimethylaminoacetic acid betaine, 2-alkyl-N-carboxymethyl-N-hydroxyethylimidazolynium betaine) and amino acid type ampholytic surfactants (e.g., sodium β-dodecylaminopropanoate).

The amount of the other surfactant added is preferably 0.001 to 0.1% by weight based on the unit cement content, from the standpoint of water evaporation preventing effect.

Suitable hydrocarbon oils include mineral oils, animal oils, plant oils, and synthetic lubricants. Typical mineral oils include spindle oil, machine oil and freezer oil. Typical animal and plant oils include beef tallow, lard, whale oil, fish oil, rape oil, soybean oil, sunflower seed oil, cotton seed oil, peanut oil, rice bran oil, corn oil, safflower oil, olive oil, sesame oil, evening primrose oil, palm oil, shea butter, sal fat, cocoa butter, coconut oil, and palm oil. Suitable synthetic lubricants include polyolefin oil (α-olefin oil), polyglycol oil, poltybutene oil, alkylbenzene oil (alkylate oil) and isoparaffin oil. The amount of the hydrocarbon oil added is preferably 0.001 to 0.1% by weight based on the unit cement content, from the standpoint of water evaporation preventing effect.

As the wax, natural waxes and synthetic waxes may be used. Suitable natural waxes include candelilla wax, carnauba wax, rice wax, Japan wax, jojoba oil, bee wax, and lanoline. Suitable synthetic waxes include microcrystalline wax, petrolatum, polyethylene wax, and Fischer-Tropsch wax. The amount of the wax added is preferably 0.001 to 0.1% by weight based on the unit cement content, from the standpoint of water evaporation preventing effect.

Suitable fatty acid amides include C26-C40 alkylene bisamides, such as ethylene bisstearyl amide, ethylene bispalmityl amide, ethylene bislaurylamide, butylene bisstearyl amide, and butylene bispalmityl amide. The amount of the fatty acid amide added is preferably 0.001 to 0.1% by weight based on the unit cement content, from the standpoint of water evaporation preventing effect.

Suitable silicone oils include polydimethylsiloxane, polyether-modified silicone, and alkyl-modified silicone. The amount of the silicone oil added is preferably 0.001 to 0.1% by weight based on the unit cement content, from the standpoint of water evaporation preventing effect.

Examples of the defoamer include alcohol, fatty acid, mineral oil, polyether, and silicone base defoamers. The amount of the defoamer added is preferably 0.001 to 0.1% by weight based on the unit cement content, from the standpoint of air content adjustment.

Typical of the lubricant are higher fatty acid salts and wax emulsions. Suitable higher fatty acid salts include C13-C24 higher fatty acid salts (e.g., sodium stearate, calcium stearate, magnesium stearate). Suitable wax emulsions include polyethylene emulsion, paraffin wax emulsion, and microcrystalline wax emulsion. The amount of the lubricant added is preferably 0.001 to 0.1% by weight based on the unit cement content, from the standpoint of water evaporation preventing effect.

Examples of the preservative include 2-bromo-2-nitro-1, 3-propane diol (BNP), 5-chloro-2-methyl-4-isothiazolin-3- on (MIT), 1,2-benzothiazolin-3-on, 2-methyl-4-isothiazolin-3-on, hexahydro-1,3,5-tris(2-hydroxyethyl)-s-triazine, hexahydro-1,3,5-tris(2-ethyl)-s-triazine, o-phenylphenol, 3-methyl-4-chlorophenol, sodium pyridine thiol oxide, dithiocarbamate, 4-(2-nitrobutyl)morpholine, and 1-(3-chloroallyl)-3,5,7-triaza-1-azoniaadamantane chloride. The amount of the preservative added is preferably 0.001 to 0.1% by weight based on the unit cement content, from the standpoint of water evaporation preventing effect.

Typical of the corrosion inhibitor are nitrites and aminoalcohols. The amount of the corrosion inhibitor added is preferably 0.001 to 0.1% by weight based on the unit cement content, from the standpoint of water evaporation preventing effect.

Examples of the thickener include organic modified montmorillonite, organic modified saponite, organic modified hectorite, organic modified sodium silicic mica sodium, organic modified lithium taeniolite, organic modified bentonite, hydroxystearic acid, polyisobutylene (Mw=30,000-100,000), polyalkyl methacrylates (Mw=500,000-2,000,000), and metal soaps (e.g., higher fatty acid aluminum such as aluminum stearate or aluminum octanoate, and higher fatty acid zinc such as zinc stearate). The amount of the thickener added is preferably 0.001 to 0.1% by weight based on the unit cement content, from the standpoint of water evaporation preventing effect.

Examples of the solvent include aliphatic alcohols (e.g., methanol, ethanol, propanol, butanol, pentanol, hexanol, isopropyl alcohol), halogenated hydrocarbons (e.g., dichloromethane, chloroform, carbon tetrachloride, 1,2-dichloroethane, 1,2-dichloroethylene, 1,1,1-trichloroethane, 1,1,2,2-tetrachloroethane, tetrachloroethylene, chlorobenzene, trichloroethylene), ketones (e.g., acetone, methyl isobutyl ketone, methyl ethyl ketone, methylcyclohexanone, methyl butyl ketone), ethers (e.g., ethyl ether, 1,4-dioxane, tetrahydrofuran), alkylene glycol monoalkyl ethers (e.g., ethylene glycol monoethyl ether, ethylene glycol monobutyl ether, propylene glycol monopropyl ether, propylene glycol monobutyl ether), polyalkylene glycol dialkyl ethers (e.g., polyethylene glycol diethyl ether, polyethylene glycol dibutyl ether, polypropylene glycol dipropyl ether, polypropylene glycol dibutyl ether), hydrocarbons (e.g., xylene, cyclohexane, styrene, toluene, n-hexane), and other polar solvents (e.g., N,N-dimethylforamide, carbon disulfide). The amount of the solvent added is preferably 0.001 to 0.1% by weight based on the unit cement content, from the standpoint of water evaporation preventing effect.

The concrete composition is prepared by dry mixing cement and an aggregate, adding thereto a water dispersion which is preformed by dispersing the specific low substituted hydroxypropyl cellulose in a part or all of the water to be added, and mixing the contents.

The water dispersion is formed by simply dispersing the low substituted hydroxypropyl cellulose in water. The resulting dispersion may not be shear, ground. When a part of the water to be added is used for preparation of the water dispersion, the remaining part of the water may be added at an appropriate time, for example, after dry mixing.

When a surfactant containing a higher alcohol and a fatty acid ester is used, the surfactant may be added together with the cement and aggregate, provided that the surfactant is solid at normal temperature or the surfactant which is liquid at normal temperature is supported on a porous powder. The surfactant which is liquid at normal temperature may be dispersed in a part of the water to be added or the water dispersion of the low substituted hydroxypropyl cellulose before it is added.

When a water-reducing agent and/or AE agent is used, they may be added together with the water dispersion of the low substituted hydroxypropyl cellulose. Alternatively, the water-reducing agent and/or AE agent may be dispersed in a part of the water to be added or the water dispersion of the low substituted hydroxypropyl cellulose before it is added.

EXAMPLE

Examples of the invention are given below by way of illustration and not by way of limitation.

Examples and Comparative Examples

Ingredients
(1) Cement (C):
  Ordinary Portland cement (Taiheiyo Cement Corp.), density: 3.16 g/cm$^3$
(2) Fine aggregate (S):
  Land sand having a maximum particle size of 5 mm from Shimonigorigawa, Myoko-shi, Niigata, Japan, water absorption: 2.79%, saturated surface-dry density: 2.57 g/cm$^3$
(3) Coarse aggregate (G):
  River gravel having a maximum particle size of 25 mm from Shimonigorigawa, Myoko-shi, Niigata, Japan, water absorption: 1.45%, saturated surface-dry density: 2.60 g/cm$^3$
(4) Water (W):
  Tap water
(5) Low substituted hydroxypropyl cellulose:
  Sample Nos. 1 to 6 shown in Table 3
(6) Water-reducing agent:
  MasterPozzolith® No. 70 (BASF Japan, Ltd.), lignin sulfonic acid-polyol composite
(7) AE agent:
  MasterAir® No. 775S (BASF Japan, Ltd.), high-alkyl carboxylate-based anionic surfactant
(8) Surfactant (X):
  SN Clean Act 900 (San Nopco Ltd., surfactant which is a blend of 55 wt % of a mixture of C15-C25 linear saturated alcohol and C15-C20 aliphatic monocarboxylic acid ester with 45 wt % of silica porous powder)

Preparation of Concrete

A concrete composition was prepared in accordance with the proportion shown in Tables 1 and 2.

Specifically, a 60-L forced double-shaft mixer was charged with the cement, fine aggregate, coarse aggregate, and optionally surfactant, which were dry mixed for 30 seconds. The water dispersion which was preformed by adding the low substituted hydroxypropyl cellulose (Sample Nos. 1 to 6 in Table 3) to the entire amount of water to be added, water-reducing agent and AE agent were then added to the mixer and mixed for 90 seconds, yielding a concrete composition. The volume of the concrete composition mixed was 40 L per batch. When the low substituted hydroxypropyl cellulose was added in powder form, it was added together with the cement and aggregates and dry mixed, after which water was added.

Using the AE agent, the air content of the concrete composition was adjusted to 4.5±1.5 wt %.

TABLE 1

| Coarse aggregate maximum size [Gmax] (mm) | Water/Cement ratio [W/C] (wt %) | Fine aggregate* [s/a] (vol %) | Unit content (kg/m³) | | | |
|---|---|---|---|---|---|---|
| | | | Water [W] | Cement [C] | Fine aggregate [S] | Coarse aggregate [G] |
| 25 | 50.0 | 45.0 | 175 | 350 | 774 | 957 |

*Fine aggregate proportion [s/a] (vol %) = (volume of fine aggregate)/(volume of fine aggregate + volume of coarse aggregate) × 100

TABLE 2

| Low substituted hydroxypropyl cellulose (C × wt %) | Water-reducing agent (C × wt %) | AE agent (C × wt %) |
|---|---|---|
| varying amount (addition amount in Tables 4 and 5) | 0.25 | varying amount (addition amount in Tables 4 and 5) |

Note:
In Table, "C × wt %" indicates the addition amount (wt %) based on the unit cement content (C) (the same applies hereinafter).

TABLE 3

| | Low substituted hydroxypropyl cellulose | | | |
|---|---|---|---|---|
| Sample No. | Hydroxypropoxy substitution (wt %) | Aspect ratio | Average particle size (μm) | 90% cumulative particle size (μm) |
| 1 | 11.1 | 5.0 | 55 | 175 |
| 2 | 12.6 | 4.5 | 50 | 150 |
| 3 | 10.0 | 5.5 | 60 | 180 |
| 4 | 7.9 | 6.5 | 65 | 190 |
| 5 | 11.5 | 3.8 | 45 | 135 |
| 6 | 8.3 | 7.2 | 68 | 195 |

The physical properties of the low substituted hydroxypropyl celluloses in Table 3 were measured by the following methods.

Hydroxypropoxy Substitution

The hydroxypropoxy substitution was determined according to the analysis of the degree of substitution of hypromellose prescribed in the Japanese Pharmacopoeia, 17th Edition.

Aspect Ratio

The aspect ratio of particles was determined by measuring the length and breadth of 50 to 200 low substituted hydroxypropyl cellulose particles under a typical optical microscope (100×), computing the ratio (length/breadth) and averaging.

Average Particle Size and 90% Cumulative Particle Size

These particle sizes were measured as volume basis particle size by powder particle size measurement based on laser light diffractometry using HELOS & RODOS (Japan Laser Corp.)

The resulting concrete compositions were evaluated by the following methods, with the results shown in Tables 4 and 5.

Evaluation Methods

1. Concrete temperature

The temperatures of ingredients were adjusted such that the concrete reached a temperature of 20±3° C. at the end of mixing.

2. Air content

The test was performed according to JIS A 1128.

3. Slump test

The test was performed according to JIS A 1101. A concrete composition having a slump value of at least 10.0 cm was judged good in fluidity.

4. Frost (freeze/thaw) damage resistance test

The test was performed according to method A in JIS A 1148-2010. The relative dynamic modulus of elasticity was measured until 300 cycles at maximum. When the relative dynamic modulus of elasticity after 300 cycles was at least 60%, the concrete composition was judged good in frost damage resistance.

5. Length change

The length change was measured until the dried concrete age of 13 weeks at maximum, according to JIS A 1129-1. When difference in the length change after the age of 13 weeks between the sample concrete and the base concrete of Comparative Example 4 (free of low substituted hydroxypropyl cellulose) was at least 1.50×10⁻⁴%, the concrete sample was judged good in drying shrinkage reduction.

TABLE 4

| | | Example | | | | | | | | |
|---|---|---|---|---|---|---|---|---|---|---|
| | | 1 | 2 | 3 | 4 | 5 | 6 | 7 | 8 | 9 |
| Low substituted hydroxypropyl cellulose | Type (Sample No.) | 1 | 1 | 1 | 1 | 2 | 3 | 4 | 1 | 1 |
| | Addition amount (C × wt %) | 0.50 | 0.75 | 1.00 | 1.50 | 0.50 | 0.50 | 0.50 | 0.50 | 0.50 |
| | Water dispersion concentration (wt %) | 1.0 | 1.5 | 2.0 | 3.0 | 1.0 | 1.0 | 1.0 | 1.0 | 1.0 |
| Amount of AE agent added (C × wt %) | | 0.01 | 0.012 | 0.013 | 0.014 | 0.01 | 0.01 | 0.01 | 0.012 | 0.015 |
| Amount* of surfactant (X) added (C × wt %) | | 0 | 0 | 0 | 0 | 0 | 0 | 0 | 0.17 | 0.28 |
| Test results | Concrete temperature (° C.) | 20.5 | 19.5 | 21.3 | 18.9 | 20.4 | 20.1 | 19.2 | 20.1 | 19.9 |
| | Air content (%) | 4.5 | 4.7 | 4.3 | 4.1 | 4.6 | 4.2 | 4.1 | 4.5 | 4.7 |
| | Slump (cm) | 18.0 | 15.5 | 12.5 | 11.5 | 17.5 | 16.5 | 16.0 | 18.0 | 17.5 |
| | Frost damage resistance (as relative dynamic modulus of elasticity) (%) | 90 | 93 | 88 | 86 | 92 | 90 | 89 | 88 | 86 |
| | Length change ×10⁻⁴ (%) | 6.28 | 6.12 | 5.95 | 5.86 | 6.41 | 6.26 | 6.19 | 6.19 | 6.11 |
| | Difference in length change ×10⁻⁴ (%) (from Comparative Example 4) | 1.87 | 2.03 | 2.20 | 2.29 | 1.74 | 1.89 | 1.96 | 1.96 | 2.04 |

*net amount of surfactant (the same applies hereinafter).

TABLE 5

| | | Comparative Example | | | |
|---|---|---|---|---|---|
| | | 1 | 2 | 3 | 4 |
| Low substituted hydroxypropyl cellulose | Type (Sample No.) | 5 | 6 | 1 | — |
| | Addition amount (C × wt %) | 0.50 | 0.50 | 0.50 | nil |
| | Water dispersion concentration (wt %) | 1.0 | 1.0 | powder form | — |
| Amount of AE agent added (C × wt %) | | 0.01 | 0.01 | 0.01 | 0.009 |
| Amount* of surfactant (X) added (C × wt %) | | 0 | 0 | 0 | 0 |
| Test results | Concrete temperature (° C.) | 19.4 | 19.9 | 20.0 | 20.0 |
| | Air content (%) | 4.7 | 4.1 | 3.9 | 4.8 |
| | Slump (cm) | 19.0 | 9.0 | 7.0 | 19.5 |
| | Frost damage resistance (%) (as relative dynamic modulus of elasticity) | 91 | 88 | 90 | 95 |
| | Length change ×$10^{-4}$ (%) | 6.94 | 6.49 | 6.40 | 8.15 |
| | Difference in length change ×$10^{-4}$ (%) (from Comparative Example 4) | 1.21 | 1.66 | 1.75 | — |

As seen from Tables 4 and 5, the concrete compositions of Examples 1 to 7 wherein the water dispersion containing the low substituted hydroxypropyl cellulose in the form of fibrous particles having an aspect ratio within the specific range was added were good in all of drying shrinkage reduction, fluidity and frost damage resistance. The concrete compositions of Examples 8 and 9 wherein the surfactant was co-present ensured to provide the drying shrinkage reducing effect without any loss of fluidity.

The concrete composition of Comparative Example 1 wherein the aspect ratio was too low showed poor drying shrinkage reduction effect as compared with Example 5. Inversely, the concrete composition of Comparative Example 2 wherein the aspect ratio was too high showed a significantly low slump value, indicating a low fluidity as compared with Example 7. The concrete composition of Comparative Example 3 wherein the low substituted hydroxypropyl cellulose was added in powder form showed a significantly low fluidity as compared with Example 1.

Japanese Patent Application Nos. 2016-214188 and 2017-128354 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A concrete composition comprising, in admixture, a water dispersion of a low substituted hydroxypropyl cellulose having a hydroxypropoxy substitution of 5 to 16% by weight in the form of fibrous particles having an aspect ratio of 4 to 7, cement, and an aggregate.

2. The composition of claim 1 wherein the low substituted hydroxypropyl cellulose has an average particle size of 40 to 100 μm and a 90% cumulative particle size of 130 to 250 μm as measured by laser diffractometry.

3. The composition of claim 1 wherein the water dispersion contains the low substituted hydroxypropyl cellulose in a concentration of 0.01 to 20% by weight.

4. The composition of claim 1 wherein the low substituted hydroxypropyl cellulose is added in an amount of 0.01 to 10% by weight based on the unit cement content.

5. The composition of claim 1, further comprising at least one water-reducing agent selected from lignin, polycarboxylate, and melamine-based water-reducing agents.

6. The composition of claim 1, further comprising a surfactant containing at least a higher alcohol and a fatty acid ester.

7. The composition of claim 1, further comprising an air-entraining agent.

8. A method for preparing a concrete composition, comprising the steps of dry mixing cement and an aggregate, adding a water dispersion to the dry mix, the water dispersion being preformed by dispersing a low substituted hydroxypropyl cellulose having a hydroxypropoxy substitution of 5 to 16% by weight in the form of fibrous particles having an aspect ratio of 4 to 7 in water, and mixing the contents.

9. The method of claim 8, further comprising the step of adding at least one water-reducing agent selected from lignin, polycarboxylate, and melamine-based water-reducing agents to the dry mix together with the water dispersion of the low substituted hydroxypropyl cellulose.

10. The method of claim 8, further comprising the step of adding a surfactant containing at least a higher alcohol and a fatty acid ester to the cement and the aggregate.

11. The method of claim 8, further comprising the step of adding an air-entraining agent to the dry mix together with the water dispersion of the low substituted hydroxypropyl cellulose.

* * * * *